United States Patent
Kaneko et al.

(10) Patent No.: US 9,671,037 B2
(45) Date of Patent: Jun. 6, 2017

(54) FUEL CUTOFF VALVE

(71) Applicant: TOYODA GOSEI CO., LTD., Kiyosu-shi, Aichi-ken (JP)

(72) Inventors: Kenichiro Kaneko, Kiyosu (JP); Yukihiro Ito, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 14/861,070

(22) Filed: Sep. 22, 2015

(65) Prior Publication Data
US 2016/0091107 A1    Mar. 31, 2016

(30) Foreign Application Priority Data
Sep. 29, 2014  (JP) .................... 2014-198276

(51) Int. Cl.
    *F16K 24/04*    (2006.01)
    *F16K 31/22*    (2006.01)

(52) U.S. Cl.
    CPC ............ *F16K 31/22* (2013.01); *F16K 24/044* (2013.01); *Y10T 137/3099* (2015.04)

(58) Field of Classification Search
    CPC ......... Y10T 137/3099; Y10T 137/0874; Y10T 137/0777; Y10T 137/86324; B60K 15/00; F16K 24/044; F16K 31/22
    See application file for complete search history.

(56) References Cited

U.S. PATENT DOCUMENTS

| | | | | |
|---|---|---|---|---|
| 5,836,341 A * | 11/1998 | Ayers | ............... | B60K 15/03504 137/202 |
| 5,971,002 A * | 10/1999 | Turpin | ............ | B60K 15/03519 137/202 |
| 5,996,607 A * | 12/1999 | Bergsma | .......... | B60K 15/03519 137/202 |
| 7,188,613 B2 * | 3/2007 | Miura | .................. | F16K 24/044 123/198 D |
| 8,365,756 B2 * | 2/2013 | Kobayashi | ....... | B60K 15/03519 137/202 |
| 2001/0011538 A1 * | 8/2001 | Crary | .................. | B60K 15/035 123/509 |
| 2008/0251134 A1 * | 10/2008 | Miura | .................. | F16K 24/044 137/409 |
| 2016/0290520 A1 * | 10/2016 | Memmer | ......... | B60K 15/03519 |

FOREIGN PATENT DOCUMENTS

JP    2007-92834 A       4/2007
JP    2010274732 A  *  12/2010

* cited by examiner

*Primary Examiner* — Jessica Cahill
(74) *Attorney, Agent, or Firm* — Posz Law Group, PLC

(57) ABSTRACT

A fuel cutoff valve includes: a casing main body having a valve chamber and a connecting hole to connect the valve chamber to the exterior of the fuel tank; a cover which has a pipe passageway which communicates with the exterior and which is connected to the connecting hole; a bottom member which has an induction chamber which has an opening portion through which liquid fuel and fuel vapor are allowed to flow and a distribution hole which communicates with the valve chamber; and a float configured to ascend and descend according to a fuel level in the fuel tank to close and open the connecting hole, wherein the bottom member has a guiding plate in the induction chamber, the guiding plate being formed into a shape of a recess portion which is oriented towards the opening portion in an axial section.

6 Claims, 10 Drawing Sheets

FUEL CUTOFF VALVE

CROSS-REFERENCE TO RELATED APPLICATION(S)

This application is based upon and claims the benefit of priority from Japanese Patent Application No. 2014-198276, filed on Sep. 29, 2014, the entire contents of which are incorporated herein by reference.

BACKGROUND

1. Field of the Invention

The present invention relates to a fuel cutoff valve which is mounted at an upper portion of a fuel tank to cut off a communication between an interior and an exterior of the fuel tank and more particularly to a passageway construction of the fuel cutoff valve to the exterior of the fuel tank.

2. Description of the Related Art

Conventionally, a technology described in JP-A-2007-92834 is known as a fuel cutoff valve of the type described above. A fuel cutoff valve is mounted at an upper portion of the fuel tank and includes a cylindrical casing main body having a connecting hole at an upper portion thereof, a float which is accommodated in a valve chamber in the casing and a cover which covers the upper portion of the housing main body to define a communication chamber and from which an exhaust port is projected to connect to a canister side. The connecting hole in the casing main body is opened or closed by raising or lowering the float not only to secure a ventilation of a fuel tank to an exterior thereof but also to prevent fuel in the fuel tank from flowing out of the fuel tank to the exterior.

The casing main body has a bottom member at a bottom thereof, and this bottom member supports the float and has an opening which is formed therein to introduce the fuel or fuel vapor in the fuel tank into the casing main body. Communication holes are formed in the bottom member to establish a communication with the casing and are formed between pedestals which support the float.

However, at the pedestals which interrupt the communication between the casing and the bottom member, fuel which flows into the bottom member from the inside of the fuel tank as a result of oscillation of the vehicle strikes surfaces of the pedestals which face the fuel tank, and the fuel so striking the pedestals flows into the valve chamber in the casing through the communication holes to flow out to the exterior which is the canister side through the connecting hole from time to time.

SUMMARY

The invention has been made to solve the problem of the prior art and an object thereof is to provide a fuel cutoff valve which reduces an amount of liquid fuel which flows out of a connecting hole to an exterior of a fuel tank with a simple configuration.

According to a first aspect of the invention, there is provided a fuel cutoff valve configured to establish and cut off a communication of a passageway between an interior and an exterior of a fuel tank, including: a casing main body having a valve chamber and a connecting hole which is formed in an upper portion of the valve chamber to connect the valve chamber to the exterior of the fuel tank; a cover which is fixed to an upper portion of the casing main body and which has a pipe passageway which communicates with the exterior and which is connected to the connecting hole; a bottom member which has an induction chamber which has an opening portion at a lower end thereof and through which liquid fuel and fuel vapor are allowed to flow and a distribution hole which is disposed in an upper portion of the induction chamber and which communicates with the valve chamber and which is joined to a lower end of the casing main body; and a float which is accommodated within the valve chamber and which is configured to ascend and descend according to a fuel level in the fuel tank to close and open the connecting hole, wherein the bottom member has a guiding plate in the induction chamber, the guiding plate being formed into a shape of a recess portion which is oriented towards the opening portion in an axial section.

According to a second aspect of the invention, in the fuel tank which uses the fuel cutoff valve according to the first aspect, although fuel drops scatter in the fuel tank FT when the fuel tank FT oscillates as a result of the oscillation of the vehicle, the scattering fuel drops strike a rear surface of the guiding plate which is formed into the recess portion and are then caused to return at an acute angle into the interior of the fuel tank easily, compared with a guiding plate which is disposed horizontally by providing the guiding plate which is formed into the shape of the recess portion which is oriented towards the opening portion in the bottom member, that is, the fuel tank side. Consequently, since it is difficult for the fuel drops to enter not only the adjacent distribution hole but also the valve chamber, it is possible to restrict the fuel from flowing out to the exterior which is on the canister side.

Additionally, since the guiding plate has an angle shape in which circumferentially inclined plate-shaped inner circumferential surfaces face each other, fuel accumulated in the valve chamber is returned quickly to the interior of the fuel tank through the inclined guiding plate.

According to a third aspect of the invention, in fuel cutoff valve according to the first aspect, the guiding plate is inclined in the direction of an outside diameter. Therefore, fuel accumulated in the valve chamber flows in the direction of the outside diameter. Since the adjacent distribution hole expands its opening area as the hole expands towards the outside diameter side, the fuel can be returned to the fuel tank side more smoothly.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, a preferred embodiment of the invention will be described to make the configuration and function of the invention that have been described above clearer.

(1) Schematic Configuration of Fuel Cutoff Valve 10

Figure 1:
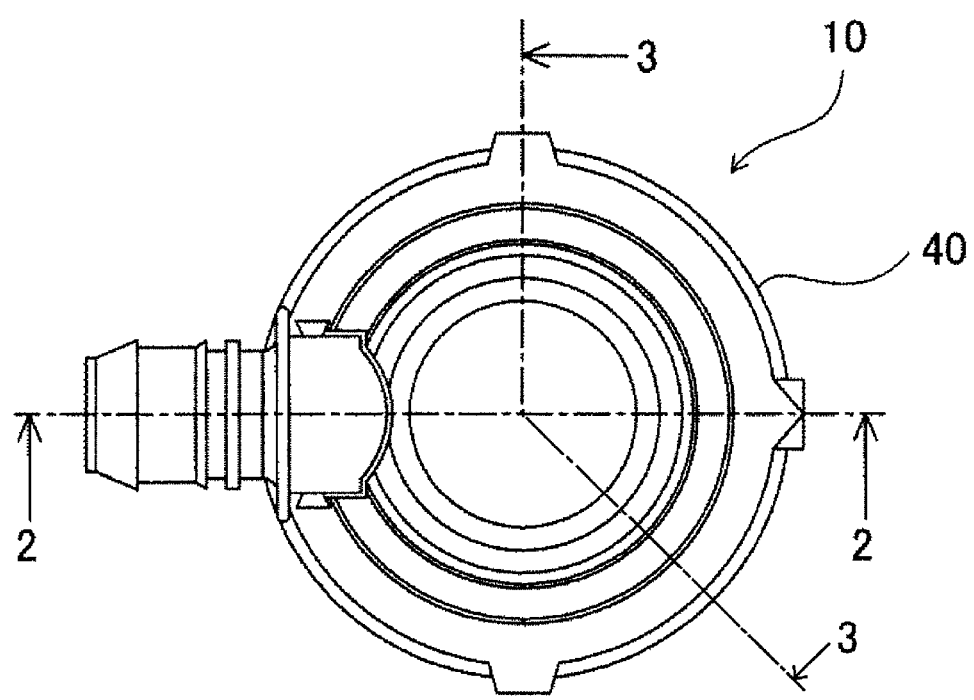
FIG. 1 is a plan view of a fuel cutoff valve according to an embodiment of the invention.
Figure 2:
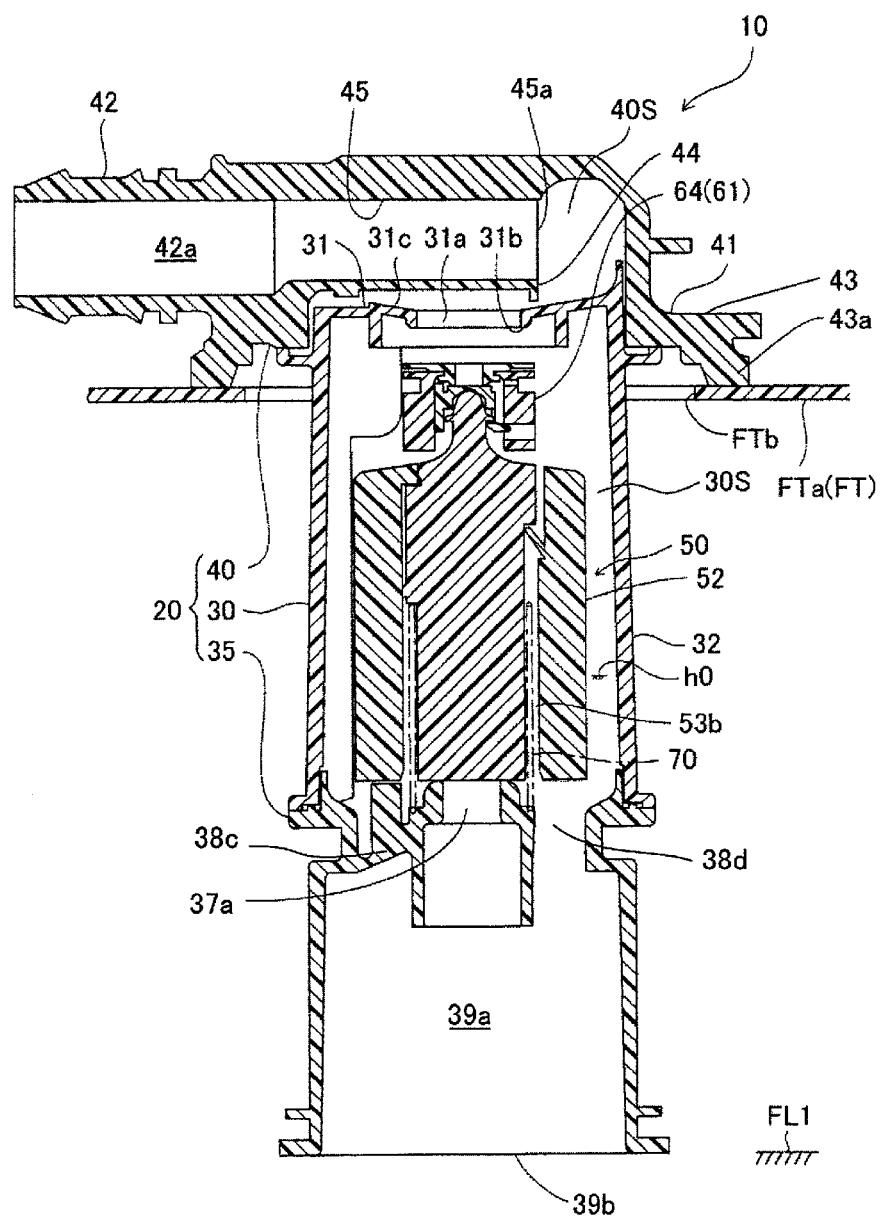
FIG. 2 is a sectional view taken along a line 2-2 in FIG. 1.
Figure 3:
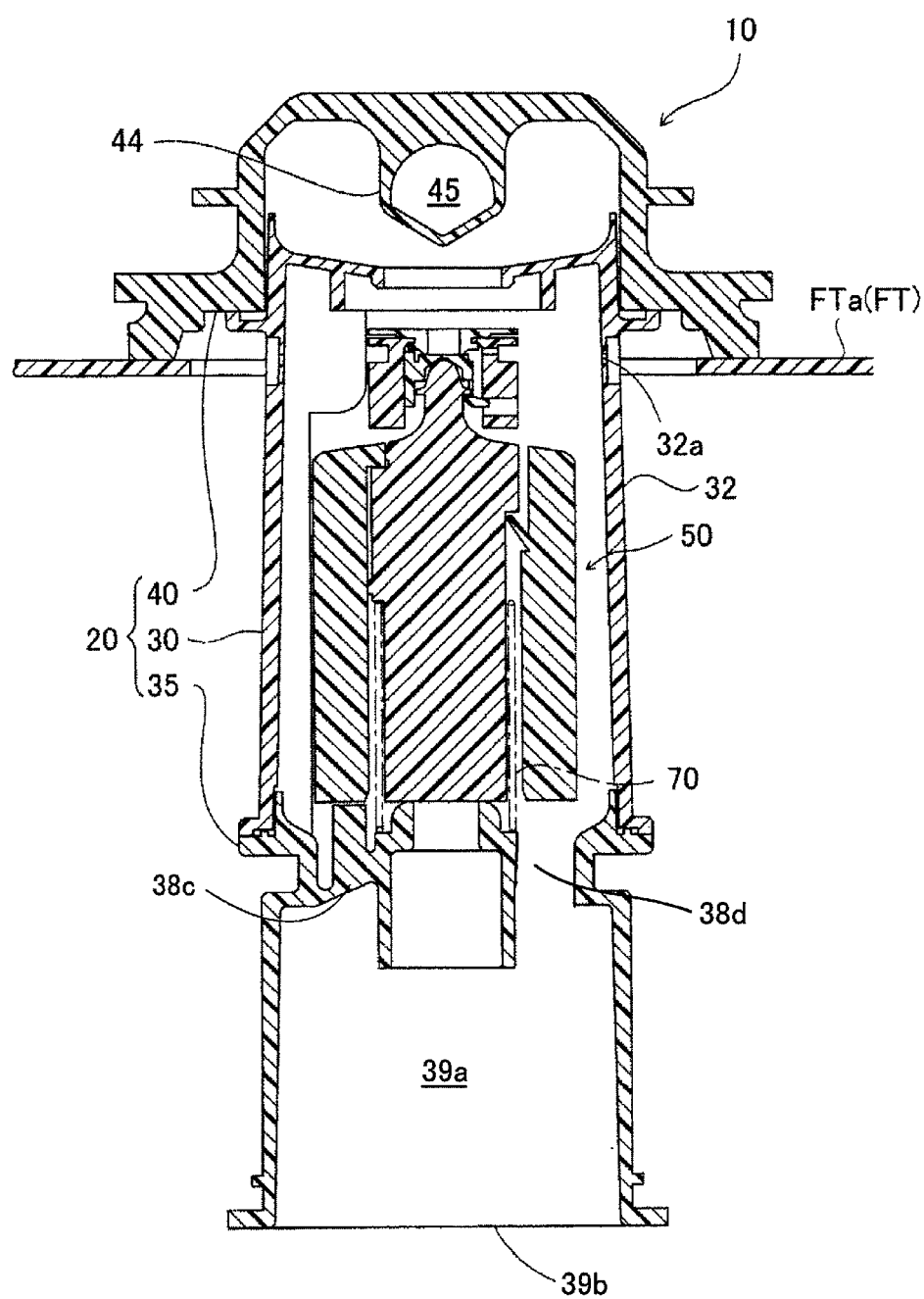
FIG. 3 is a sectional view taken along a line 3-3 in FIG. 1.

FIG. 1 is a plan view of a fuel cutoff valve 10 according to an embodiment of the invention, FIG. 2 is a sectional view taken along a line 2-2 in FIG. 1, and FIG. 3 is a sectional view taken along a line 3-3 in FIG. 1. In FIG. 2, a surface of a fuel tank FT is formed of a composite resin material containing polyethylene, and a mounting hole FTb is formed in a tank upper wall FTa. The fuel cutoff valve 10 is mounted on the tank upper wall FTa in such a state that a lower portion thereof projects into the mounting hole FTb. The fuel cutoff valve 10 includes a casing 20, a float mechanism 50, and a spring 70 as main constituent elements. The casing 20 includes a casing main body 30, a bottom member 35 and a cover 40. A space surrounded by the casing main body 30 and the bottom member 35 constitutes a valve chamber 30S, and the float mechanism 50 is accommodated in this valve chamber 30S while being supported by the spring 70. The fuel cutoff valve 10 functions not only to release fuel vapor in the fuel tank FT to the exterior but also to restrict fuel in the fuel tank FT from flowing out to a canister to stop automatically the supply of fuel when fuel reaches a predetermined fuel level FL1 in the fuel tank FT at the time of filling the fuel tank FT.

(2) Configurations of Constituent Elements of Fuel Cutoff Valve 10

Figure 4:
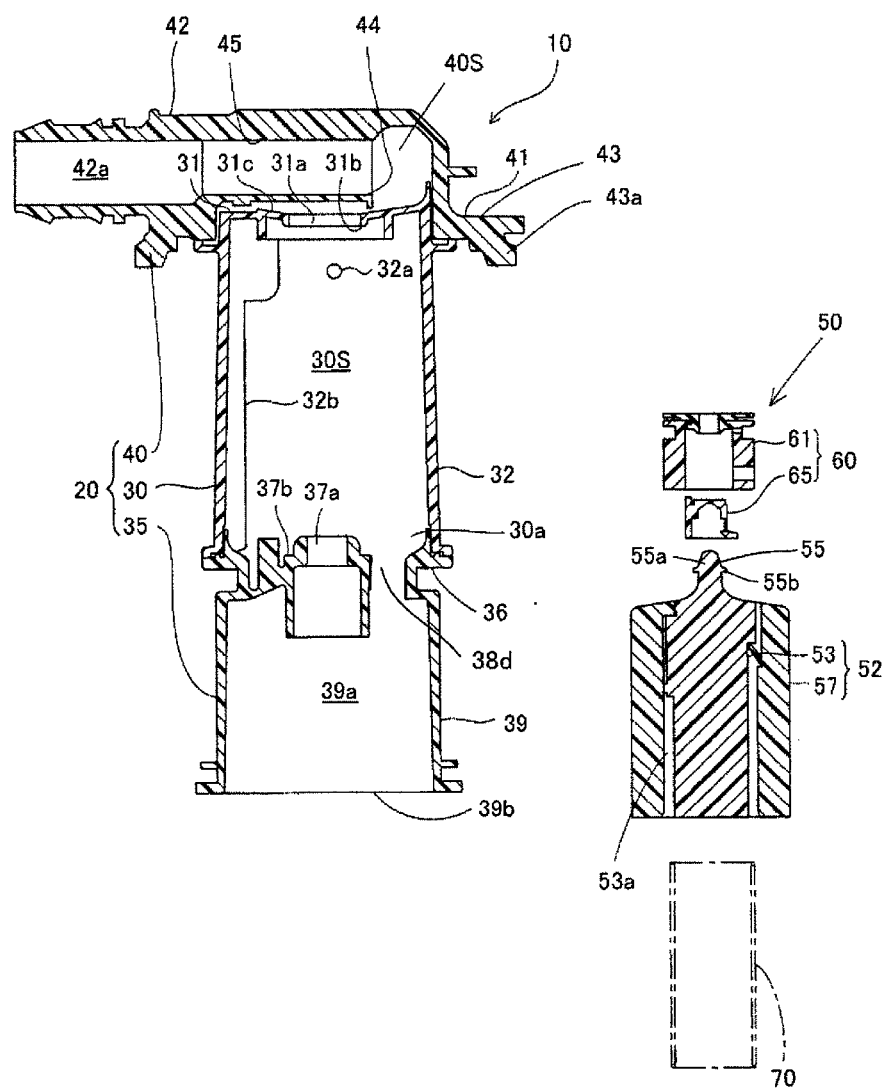
FIG. 4 is an exploded sectional view of the fuel cutoff valve.

FIG. 4 is an exploded sectional view of the fuel cutoff valve 10. The casing main body 30 has a cup shape which is surrounded by a ceiling wall 31 which makes up the upper wall and a side wall 32, and a lower portion thereof is made into a connecting hole 30a. A connecting hole 31a is formed so as to penetrate a central portion of the ceiling wall 31. A side of the connecting hole 31a which faces the valve chamber 30S is made into a seal portion 31b. The ceiling wall 31 is made into an inclined wall 31c which is inclined downwards towards the connecting hole 31a.

A communication hole 32a is provided in an upper portion of the side wall 32 so as to connect an interior of the fuel tank FT to the valve chamber 30S. Additionally, ribs 32b are provided on an inner wall of the side wall 32 at four to eight circumferential locations so as to guide a float 52. The bottom member 35 is a member which not only closes part of an opening at a lower end of the casing main body 30 but also induces fuel vapor and liquid fuel into the valve chamber 30S.

Figure 5:
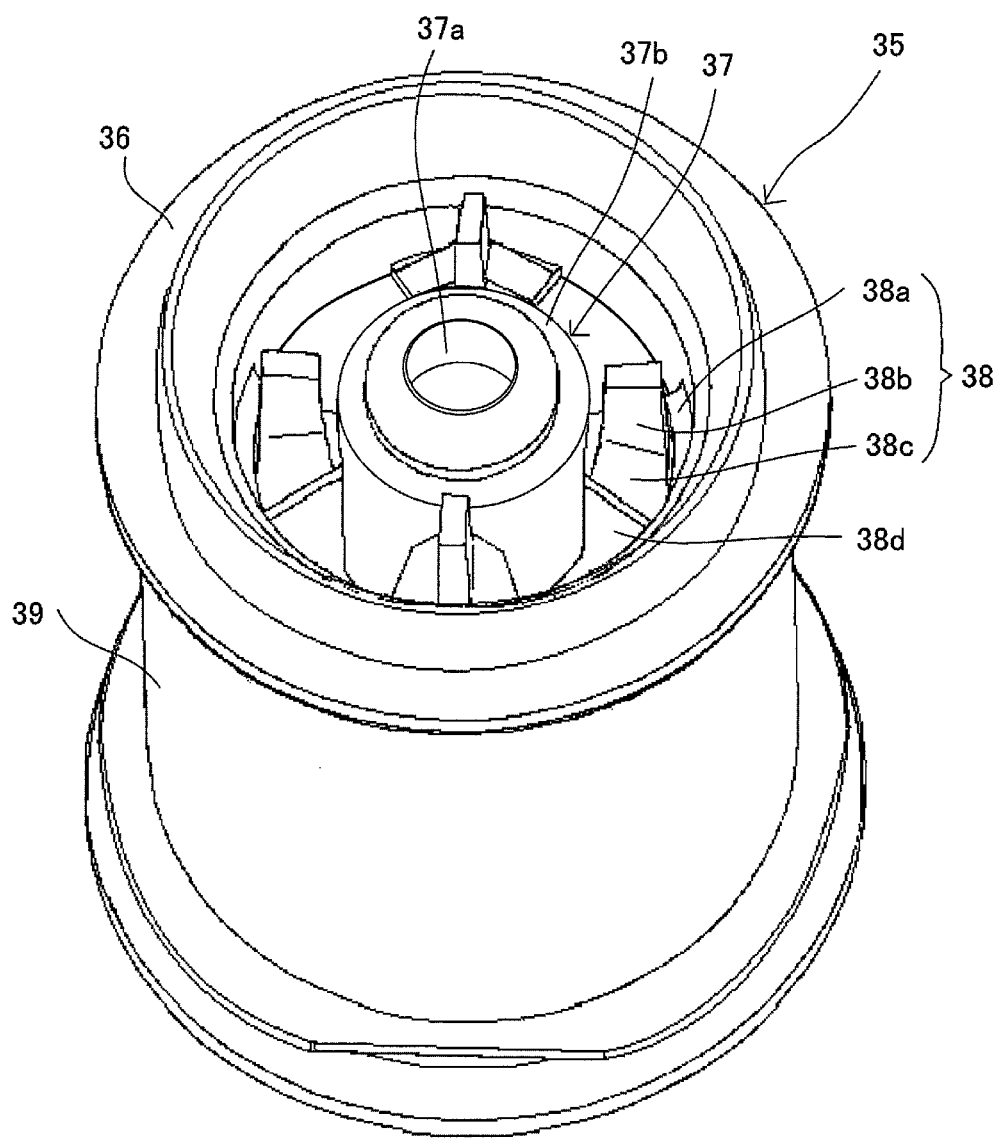
FIG. 5 is a perspective view of a bottom member.

FIG. 5 is a perspective view of the casing main body. A bottom plate 36, a distribution hole forming portion 37, supporting members 38, and a cylindrical induction passageway forming member 39 which is formed so as to project from an outer circumferential portion of the bottom plate 36 are formed integrally into the bottom member 35, which is then welded to a lower end of the casing main body 30 along the outer circumferential portion of the bottom plate 36. The distributing hole forming portion 37 and the supporting members 38 are disposed in an induction chamber 39a of the induction passageway forming member 39, which will be described later.

The distributing hole forming portion 37 includes a cylindrical distributing hole 37a. A spring supporting portion 37b which bears a lower end of the spring 70 is formed on an upper surface of an outer circumferential wall which is formed to be lowered further downwards towards the fuel tank FT than a portion of the distributing hole 37a which is opened towards the valve chamber 30S.

Figure 6:
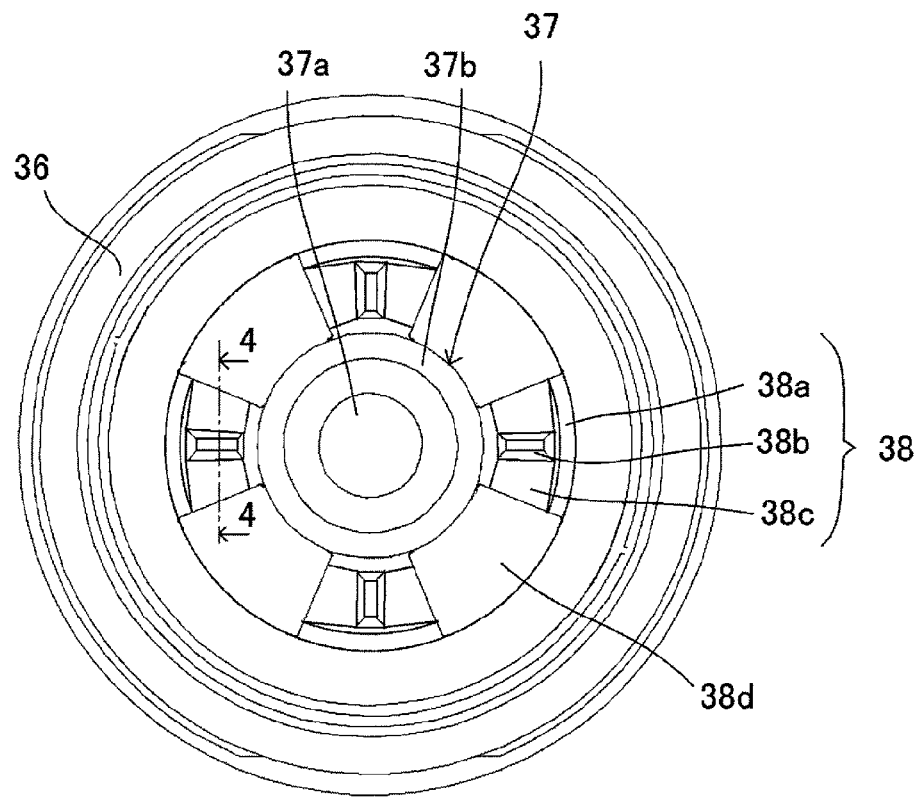
FIG. 6 is a view of the bottom member as seen from the top thereof.

FIG. 6 is a view of the bottom member as seen from the top thereof. As shown in FIGS. 5 and 6, the supporting members 38 project from an outer circumferential wall of the distributing hole forming portion 37 to connect to inner circumferential walls of the bottom plate 36 and the induction passageway forming member 39 and are disposed at four locations which are situated at equal intervals in a circumferential direction. The supporting members 38 each include a connecting portion 38a, a pedestal 38b and a guide plate 38c. Distributing holes 38d are formed between the supporting members 38.

The connecting portion 38a connects the outer circumferential surface of the distributing hole forming portion 37 and the inner circumferential surface of the induction passageway forming member 39 at a portion which is lowered further downwards towards the interior of the fuel tank FT than an end of the distributing hole 37a which is opened to the valve chamber 30S. The pedestal 38b having a quadrangular prism shape is provided at a central portion of the connecting portion 38a so as to project to the end of the distributing hole 37a which is opened to the valve chamber 30S, and an upper surface of the pedestal 38d constitutes a surface where a lower end face of the float 52 is seated. As shown in FIG. 6, the connecting portions 38a, the guiding plates 38c and the distributing holes 38d expand into a fan-like shape radially outwards towards the outside diameter side.

Figure 7:
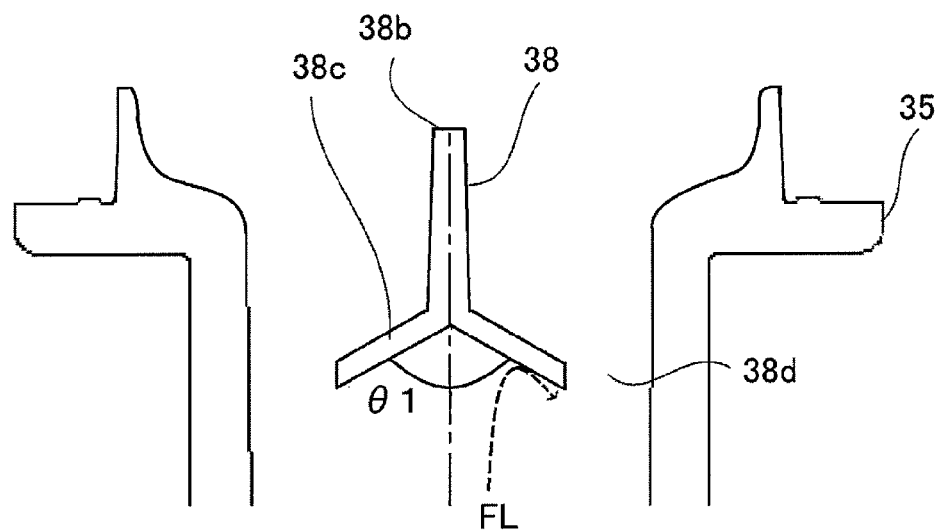
FIG. 7 is a sectional view taken along a line 4-4 in FIG. 6.

FIG. 7 is a sectional view taken along a line 4-4 in FIG. 6. As shown in FIGS. 5 and 7, the guiding plate 38c has an angle-like shape which is opened towards an opening portion 39b, which will be described later, in an axial section, that is, a shape in which two guiding plates project in the circumferential direction from side walls of the pedestal 38b. A lower end of the pedestal 38b to which the two guiding plates are connected constitutes an apex of the angle-like shape of the guiding plate 38c formed by the two guiding plates. In this embodiment, an angle θ1 formed by the guiding plate 38c is 120°. This angle θ1 is preferably 80° to 140° and more preferably 90° to 130°. Additionally, the guiding plate 38c and the connecting portion 38a are inclined towards the fuel tank FT as they extend radially outwards in the direction of the outside diameter.

The induction passageway forming member 39 includes an induction chamber 39a which projects from the bottom plate 36 into a cylindrical shape. The induction chamber 39a is a passageway which guides liquid fuel and fuel vapor which are taken in from the opening portion 39b which is situated at a lower end of the induction passageway forming member 39 and which is opened to the interior of the fuel tank FT into the valve chamber 30S of the casing main body 30.

Figure 8:
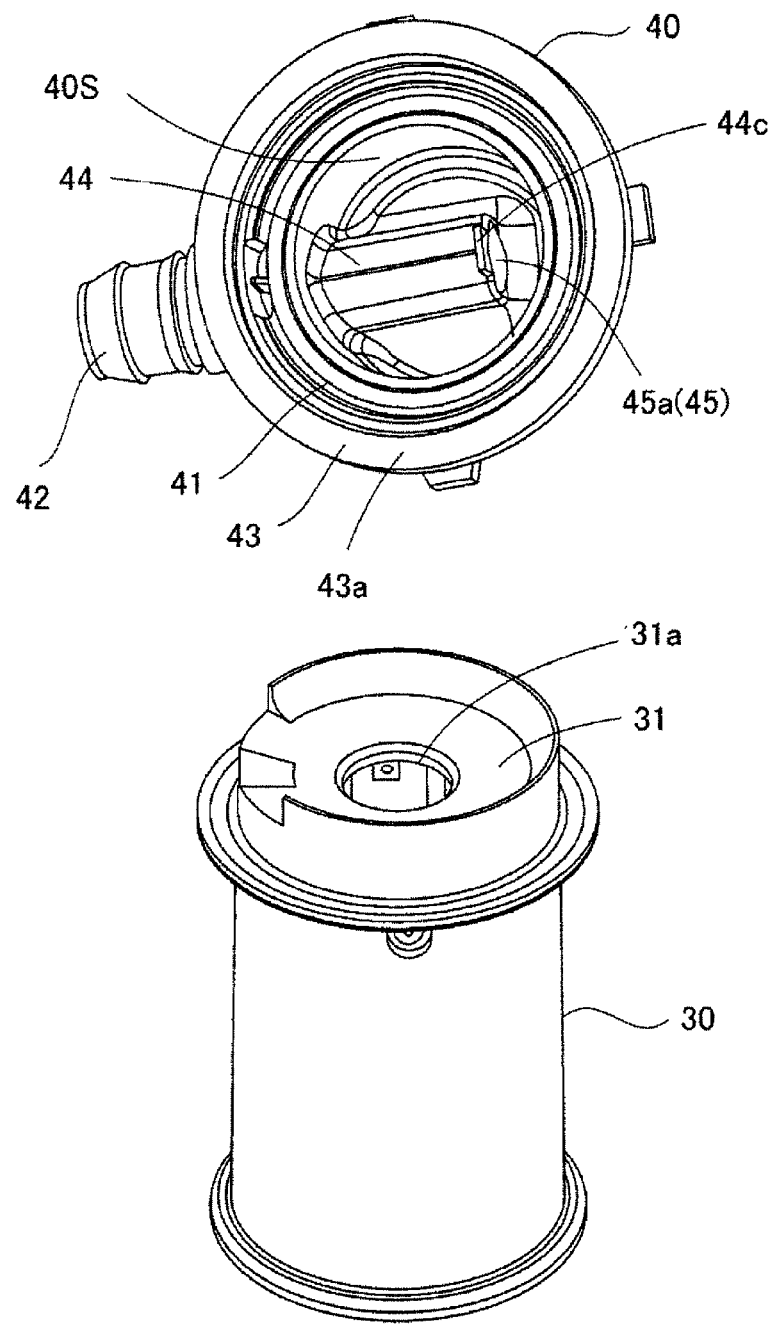
FIG. 8 is a view illustrating a cover and a casing main body in such a state that the cover is removed from the casing main body.

FIG. 8 is a view illustrating a state that the cover 40 is removed from the casing main body 30. The cover 40 includes a lid main body 41, a pipe body portion 42 which projects sideways from an outer circumferential portion of the lid main body 41 and a pipe extended portion 44 which is extended from an inner end portion of the pipe body portion 42, and a space surrounded by the upper portion of the casing main body 30 and the cover 40 is formed into a communicating chamber 40S. A flange 43 is formed on the outer circumferential portion of the lid main body 41. The flange 43 is welded to the upper portion of the casing main body 30 and is also welded to the fuel tank upper wall FTa of the fuel tank FT at an outer welding portion 43a (refer to FIG. 2).

Figure 9:
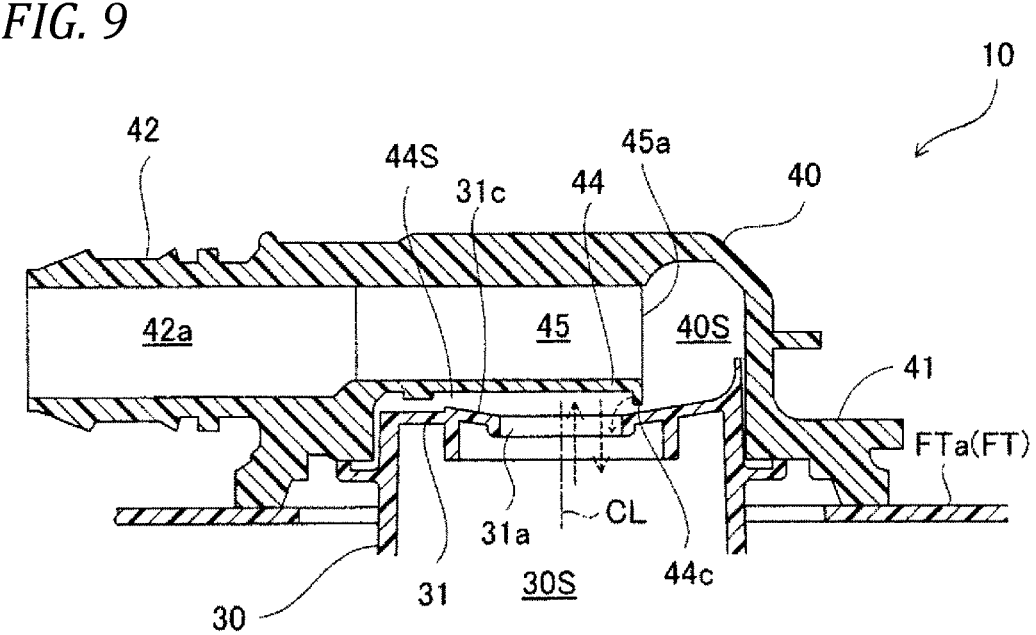
FIG. 9 is a sectional view showing an upper portion of the fuel cutoff valve shown in FIG. 2.
Figure 10:
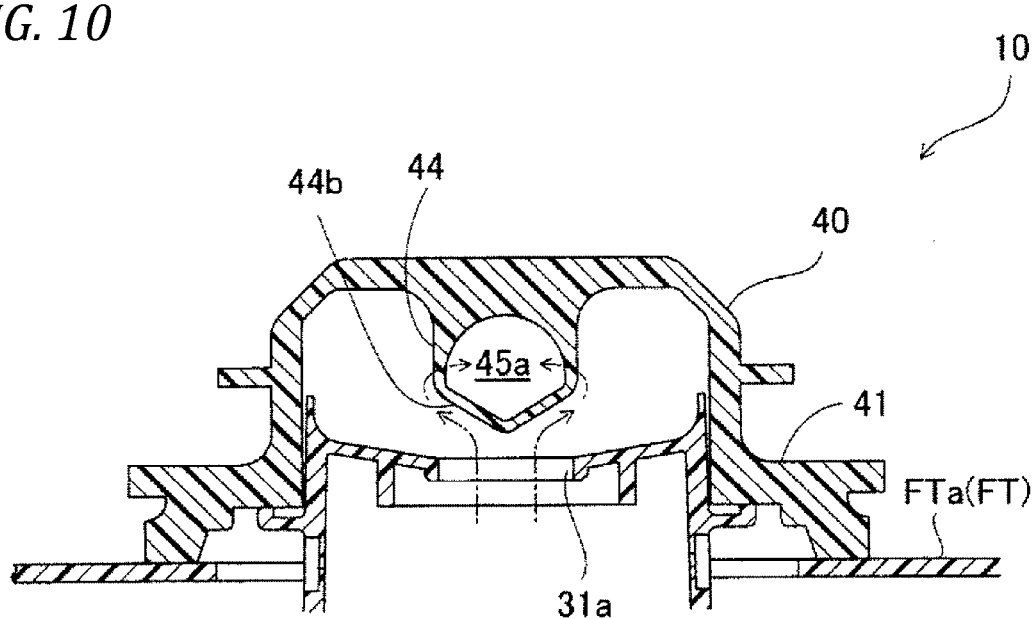
FIG. 10 is a sectional view showing an upper portion of the fuel cutoff valve shown in FIG. 3.

FIG. 9 is a sectional view showing the upper portion of the fuel cutoff valve 10 shown in FIG. 2, and FIG. 10 is a sectional view showing the upper portion of the fuel cutoff valve 10 shown in FIG. 3. An interior of the pipe body portion 42 is formed into a pipe passageway 42a having a circular cross section, and an interior of the pipe extended portion 44 is formed into an extended passageway 45 which connects to the pipe passageway 42a. As shown in FIG. 10, an upper portion of the extended passageway 45 has a semicircular shape, and a lower portion forms an isosceles triangle and is connected to the pipe passageway 42a having a circular cross section via a continuous curved surface. One end of the pipe passageway 42a is connected to a canister (not shown) and one end of the extended passageway 45 which is connected to the pipe passageway 42a is configured as an inlet port 45a. The inlet port 45a is provided on an opposite side to the pipe body portion 42 across the connecting hole 31a and is opened to the communication chamber 40S, whereby the extended passageway 45 is connected to the valve chamber 30S of the casing main body 30 through the connecting hole 31a. The pipe extended portion 44 is disposed so as to be spaced away upwards a predetermined distance from the ceiling wall 31, so that part of the communication chamber 40S between the pipe extended portion 44 and the ceiling wall 31 is made into a liquid reservoir 44S. Since the cover 40 and the casing main body 30 are welded together, the liquid reservoir 44S is kept liquid-tight relative to the exterior. Additionally, since part of the ceiling wall 31 is made into the inclined wall 31c, the liquid reservoir 44S is made into a space which is inclined downwards towards the connecting hole 31a. A shielding projecting portion 44c is formed at an outer end portion of the inlet port 45a which is an end portion of the pipe extended portion 44 so as to project downwards in a position corresponding to the connecting hole 31a.

In FIG. 10, a lower surface of the pipe extended portion 44 which is a surface corresponding to the connecting hole 31a is made into a guiding inclined surface 44b which is laterally symmetrical with respect to a center of the connecting hole 31a. The guiding inclined surface 44b guides a gas flow which flows out of the connecting hole 31a to both sides from the center of the connecting hole 31a. The function of the extended pipe portion 44 or the like will be described later.

As shown in FIG. 9, the float mechanism 50 has a two-stage valve construction in which the reopen valve characteristics are enhanced and includes the float 52 and an upper valve body 60 which is disposed at an upper portion of the float 52. The float 52 includes a first float portion 53 and a second float portion 57, which are assembled together integrally. A valve supporting portion 55 is provided at an upper portion of the first float portion 53 so as to project therefrom. The valve supporting portion 55 is a portion which supports the upper valve body 60 so as to be capable of performing a swing motion and includes a supporting projecting portion 55a which is an almost conical projection (a projecting shape). An annular projecting portion 55b is formed along an outer circumferential portion of the valve supporting portion 55 so as to prevent the dislocation of the upper valve body 60. A spring accommodating gap 53a is provided in a gap between an outer circumferential portion of the first float portion 53 and an inner circumferential portion of the second float portion 57, and the spring 70 is disposed in the spring accommodating gap 53a.

Figure 11:
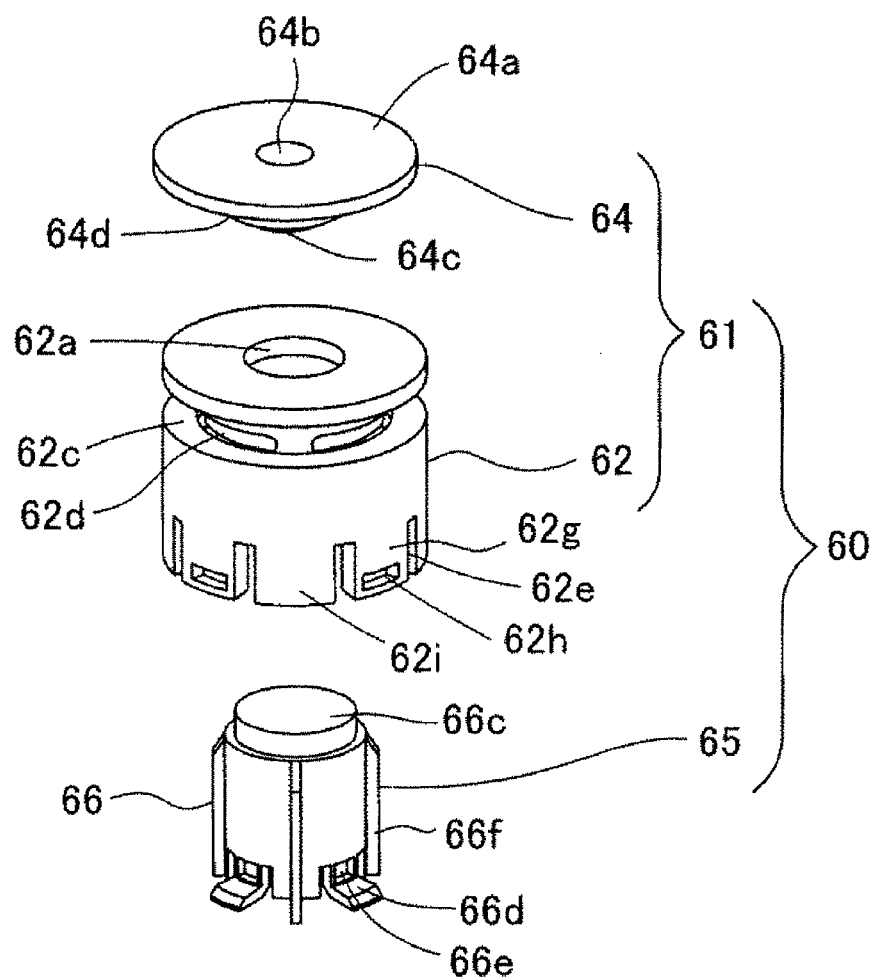
FIG. 11 is an exploded perspective view of a first valve portion and a second valve portion which make up an upper valve body.
Figure 12:
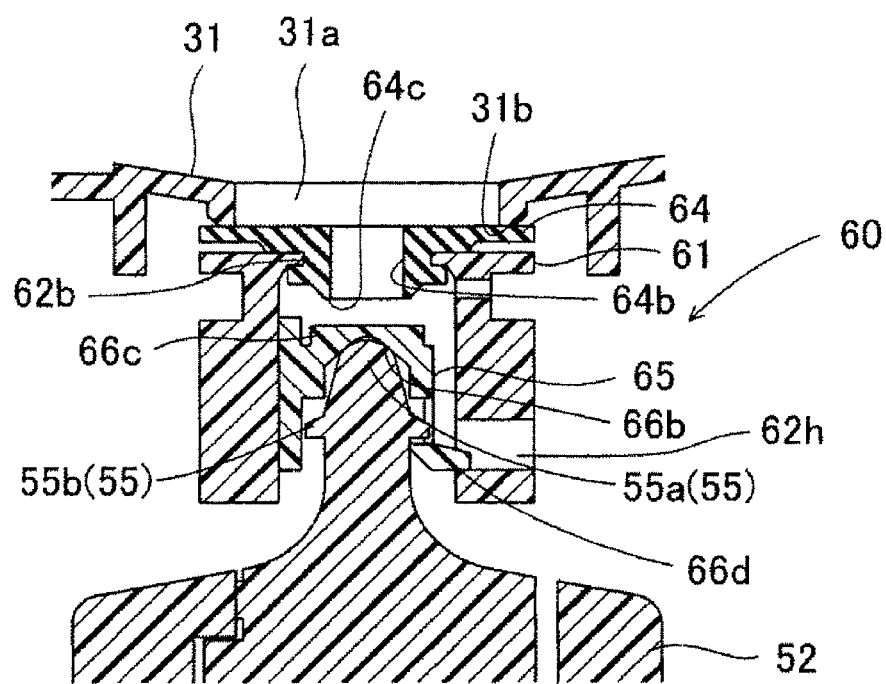
FIG. 12 is a sectional view of the upper valve body.

The upper valve body 60 is a valve which not only opens and closes the connecting hole 31a but also enhances the reopen valve characteristics and is supported on the valve supporting portion 55 of the float 52 so as not only to ascend and descend but also to be capable of performing a swing motion. FIG. 11 is an exploded perspective view showing a first valve portion 61 and a second valve portion 65 which make up the upper valve body 60, and FIG. 12 is a sectional view of the upper valve body 60. The first valve portion 61 includes a first valve main body 62 which is almost cylindrical and a seat member 64. A supporting hole 62a is formed axially in the first valve main body 62. A mounting portion 62b is formed at an upper portion of the first valve main body 62 so that the seat member 64 is mounted on the first valve main body 62. Additionally, an annular recess portion 62c is formed along an outer circumferential portion of the first valve main body 62, and ventilation holes 62d are formed at four locations in the annular recess portion 62c so as to connect the supporting hole 62a to the exterior. Slits 62e are formed in a lower portion of the first valve main body 62, and these slits 62e enable engaging pieces 62g to elastically be deformed from fixed pieces 62i. Engaging holes 62h are formed in the engaging pieces 62g.

The seat member 64 includes a first seat portion 64a which sticks to and moves away from the seal portion 31b, a communication hole 64b which is connected to the supporting hole 62a, a seal portion 64c which is formed at a lower end portion of the communication hole 64b and a mounting portion 64d and is formed integrally of a rubber material. The seat member 64 is mounted on the mounting portion 62b of the first valve main body 62 at the mounting portion 64d. The first seat portion 64a has a gap between an upper surface of the first valve main body 62 and itself, whereby the seat member 64 is allowed to elastically be deformed when seated on the seal portion 31b so as to enhance the sealing performance.

The second valve portion 65 includes a second valve main body 66 having a cylindrical shape. A bottomed hole which is opened at a lower end is formed in the second valve main body 66, and a concave supported portion 66b is formed at a central portion of a bottom of the bottomed hole. The supported portion 66b is placed on the valve supporting portion 55 of the float 52, whereby the second valve portion 65 is supported so as to be capable of performing a swing motion on the valve supporting portion 55 as a fulcrum.

Additionally, a second seat portion 66c is formed on an upper surface of the second valve main body 66, and this second seat portion 66c is formed so as to open and close the communication hole 64b by being allowed to stick to and move away from the seal portion 64c of the first valve portion 61. Dislocation preventing claws 66d are formed at four locations on a lower portion of the second vale main body 66, and by engaging the dislocation preventing claws 66d in the corresponding engaging holes 62h in the first valve main body 62, the first valve portion 61 is supported on the second valve portion 65 so as to ascend and descend.

Engaging holes 66e are formed individually in upper portions of the dislocation preventing claws 66, and by engaging the engaging holes 66e on the annular projecting portion 55b of the float 52, the second valve portion 65 is supported on the float 52 so as to ascend and descend and is also prevented from being dislocated from the float 52. Elongated guiding projections 66f are formed on an outer circumferential portion of the second valve main body 66 so as to guide the second valve portion 65 in a vertical direction. The elongated guiding projections 66f are formed on a side wall of the second valve main body 66 at four locations which are situated at equal intervals in the circumferential direction in the form of vertical ribs so as to slide on an inner wall surface of the supporting hole 62a.

In addition, a center of gravity of the upper valve body 60 is set to be lower than the supported portion 66b. To realize this, the fixed pieces 62i are formed so as to increase the weight of the lower portion. Additionally, the centering of the upper valve body 60 with the float 52 can be facilitated by forming the valve support portion 55 into the projecting shape and the supported portion 66b into the concave shape, and moreover, since the center of gravity can easily be set lower relative to the fulcrum, the posture of the upper valve body 60 becomes stable.

(3) Operation of Fuel Cutoff Valve 10

Next, the operation of the fuel cutoff valve 10 will be described. As shown in FIG. 2, when fuel is started to be supplied into the fuel tank FT by a fueling gun (not shown), fuel vapor staying in the upper portion of the fuel tank FT flows into the valve chamber 30S from the induction chamber 39a, the distributing hole 37a and the distributing holes 38d of the bottom member 35 as the fuel level in the fuel tank FT rises. Further, the fuel vapor is released from the valve chamber 30S to the canister side through the connecting hole 31a, the communication chamber 40S, the extended passageway 45 and the pipe passageway 42a. Then, when the fuel level in the fuel tank FT reaches the predetermined fuel level FL1, the liquid fuel closes the opening portion 39b whereby a tank internal pressure in the fuel tank FT is raised. In this state, a differential pressure between the tank internal pressure and the pressure in the valve chamber 30S is increased, and the liquid fuel flows into the valve chamber 30S through the induction chamber 39a and the distributing hole 37a and the distributing holes 38d, and the fuel level rises in the valve chamber 30S. When the fuel level in the valve chamber 30S reaches a level h0, an upward force by the buoyancy of the float 52 and the load of the spring 70 is balanced against a downward force based on the own weight of the float mechanism 50, and the former surpasses the latter, whereby the float mechanism 50 rises as an integral unit. Then, the seat member 64 of the first valve portion 61 is seated on the seal portion 31b to thereby close the connecting hole 31a. As this occurs, the fuel is caused to stay in the inlet pipe, and when the fuel comes into contact with the fueling gun (not shown), the automatic stop function is activated. This can not only release the fuel vapor from the fuel tank but also prevent the fuel from flowing out of the fuel tank.

On the other hand, when the fuel in the fuel tank FT is consumed to lower the fuel level, the buoyancy of the float 52 is reduced whereby the float 52 descends. When the float 52 descends, the float 52 lowers the second valve portion 65 via the engagement of the dislocation preventing claws 66d of the second valve 65 with the annular projecting portion 55b of the float 52 shown in FIG. 12. This moves the second seat portion 66c away from the seal portion 64c to open the communication hole 64b. The pressure in the lower portion of the first valve portion 61 becomes equal to a pressure near the connecting hole 31a by communication of the communication hole 64b. Since the dislocation preventing claws 66d are in engagement with the engaging holes 62h, the first valve portion 61 is also lowered via the second valve portion 65. Then, the descending of the first valve portion 61 moves the seat member 64 away from the seal portion 31b to open the connecting hole 31a. In this way, by setting the passageway area of the communication hole 64b smaller than the passageway area of the connecting hole 31a, the upper valve body 60 is opened with a small force to function to promote the enhancement of the reopen valve characteristics.

(4) Function and Advantage of the Embodiment

The configuration of the embodiment provides the following working effect.
(4)-1

In FIG. 7, when the vehicle oscillates and the liquid fuel in the fuel tank FT attempts to enter the valve chamber 30S of the casing main body 30 through the induction chamber 39a, a scattering fuel drop FL indicated by a broken line in FIG. 7 strikes the surface of the guide plate 38c which faces the fuel tank FT and is returned to the induction chamber 39a. As this occurs, the guiding plate 38c has the angle shape which is formed by joining the two inclined plates, that is, since one surface of the guiding plate 38c which is a surface of one of the two inclined plates is inclined towards the valve chamber 30S in the direction in which the surface moves away from the distributing hole 38d in the circumferential direction, the liquid fuel which strikes the guiding plate 38c has difficulty in flowing in the circumferential direction and hence has difficulty in flowing into one of the adjacent distributing holes 38d. Additionally, since there may be a case where the scattering fuel drop FL which is returned by the one surface of the guiding plate 38c strikes the other surface of the guiding plate 38c which is a surface of the other plate of the two inclined plates, the scattering fuel drop FL has difficulty in entering the other distributing holes 38d. Consequently, since the amount of liquid fuel which flows into the valve chamber 30S can be reduced, the amount of liquid fuel which flows out to the exterior which is the canister side through the connecting hole 30a can be reduced. Additionally, since the guiding plate 38c has the angle shape which is formed by joining the two plates which are oriented to the valve chamber 30S, the liquid fuel which enters the valve chamber 30S can be returned smoothly to the fuel tank FT through the induction chamber 39a after flowing down on the upper surface of the guiding plate 38c.
(4)-2

Further, since the guiding plate 38c is inclined in the direction of the outside diameter, the fuel which flows into the valve chamber flows in the direction of the outside diameter in which the guiding plate 38c is inclined. As this occurs, in the direction of the outside diameter, the opening areas of the adjacent distributing holes 38d increase more as they expand in the direction of the outside diameter. Therefore, a risk of merging of flows of discharged fuel is small, whereby the fuel can be returned smoothly into the fuel tank FT.

It is noted that the invention is not limited to the embodiment described heretofore and hence can be carried out in various modes without departing from the spirit and scope of the invention. For example, the following modification is possible. While the guiding plate 38c is formed into the angle shape in the axial section in the embodiment, the guiding plate 38c may have a circular or arc-shaped axial cross section.

What is claimed is:

1. A fuel cutoff valve configured to establish and cut off a communication of a passageway between an interior and an exterior of a fuel tank, comprising:
   a casing main body having a valve chamber and a connecting hole which is formed in an upper portion of the valve chamber to connect the valve chamber to the exterior of the fuel tank;
   a cover which is fixed to an upper portion of the casing main body and which has the passageway which communicates with the exterior and which is connected to the connecting hole;
   a bottom member which has an induction chamber which has an opening portion at a lower end thereof and through which liquid fuel and fuel vapor are allowed to flow and a distribution hole which is disposed in an upper portion of the induction chamber and which communicates with the valve chamber and which is joined to a lower end of the casing main body;
   a float which is accommodated within the valve chamber and which is configured to ascend and descend according to a fuel level in the fuel tank to close and open the connecting hole, wherein
   the bottom member has a guiding plate in the induction chamber, the guiding plate being formed into an angle shape which is oriented and opened towards the opening portion in an axial section, the opening portion is at the lower end of the induction chamber; and
   the guiding plate has circumferentially inclined plate-shaped inner circumferential surfaces facing each other.

2. The fuel cutoff valve according to claim 1, wherein the guiding plate includes two inclined plates joined in the angle shape, surfaces of the two inclined plates are the inclined plate-shaped inner circumferential surfaces that face each other.

3. The fuel cutoff valve according to claim 1, wherein the guiding plate and the distribution hole are adjacent to each other.

4. The fuel cutoff valve according to claim 1, wherein the guiding plate is inclined in the direction of an outside diameter.

5. The fuel cutoff valve according to claim 4, wherein the guiding plate includes two inclined plates joined in the angle shape, surfaces of the two inclined plates are the inclined plate-shaped inner circumferential surfaces that face each other.

6. The fuel cutoff valve according to claim 5, wherein the guiding plate and the distribution hole are adjacent to each other.

* * * * *